UNITED STATES PATENT OFFICE.

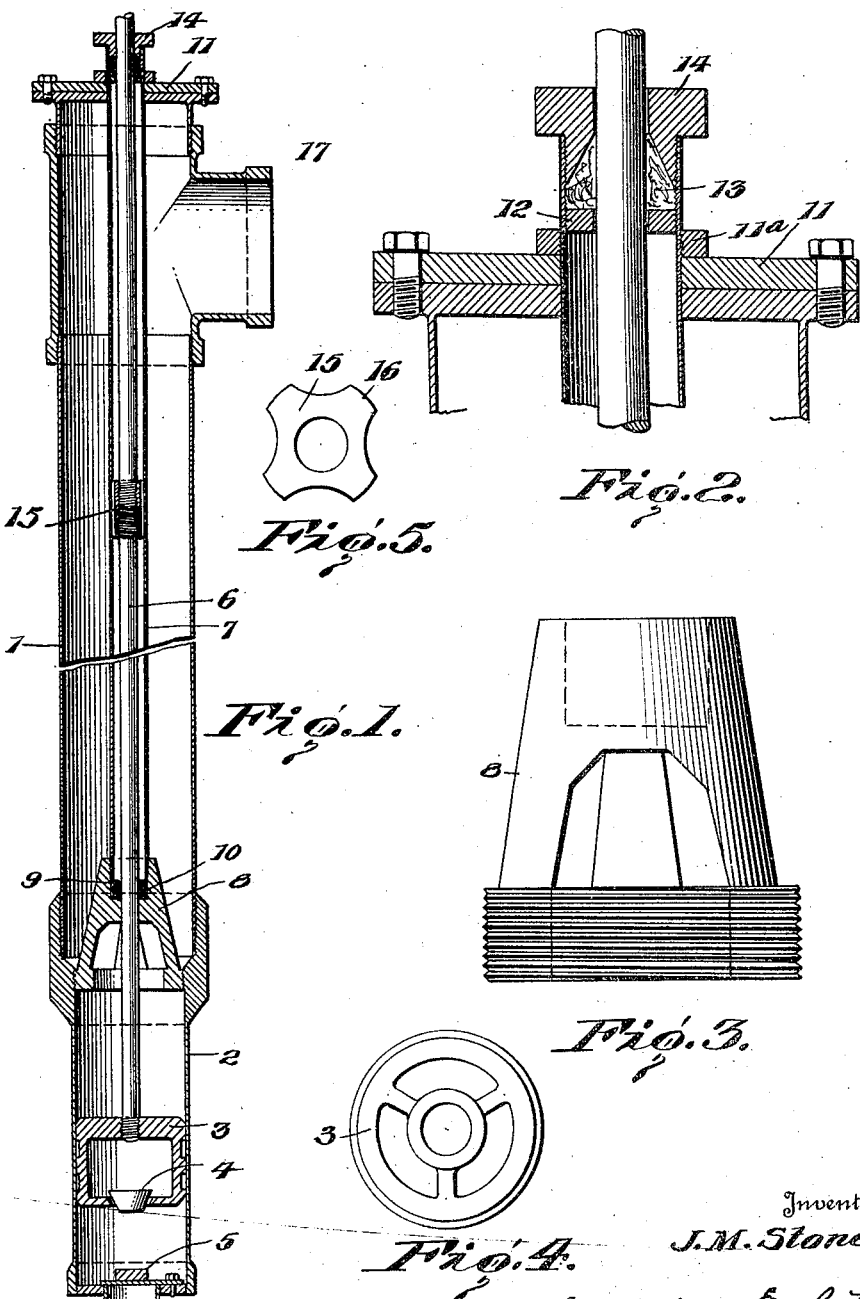

JOHN M. STONE, OF CARRIZO SPRINGS, TEXAS.

PUMP.

1,412,146.  Specification of Letters Patent.  Patented Apr. 11, 1922.

Application filed June 21, 1921. Serial No. 479,205.

*To all whom it may concern:*

Be it known that I, JOHN M. STONE, a citizen of the United States, residing at Carrizo Springs, in the county of Dimmit and State of Texas, have invented certain new and useful Improvements in Pumps, of which the following is a full, clear, and exact description.

The invention relates to pumps, and more particularly to deep well pumps, and has for its object to provide such a device with means to prevent vibration of the sucker rod.

Another object of the invention is to provide means for automatically lubricating the sucker rod and related parts whereby the same is maintained in proper condition at all times.

Another object of the invention is to so lock the parts as to prevent any chance of becoming detached.

Other objects and advantages of the invention will be apparent from the following description when taken in connection with the accompanying drawing, in which:

Figure 1 is a longitudinal section through the pump.

Figure 2 is an enlarged section through a portion of the pump.

Figure 3 is a side view of the spider.

Figure 4 is a bottom plan of the piston, and

Figure 5 is a plan view of a rod coupling.

Referring to the drawing more in detail, the numeral 1 designates the main barrel of the pump to which is threaded at the lower end thereof the cylinder 2, in which reciprocates the piston 3; the cylinder forming a substantial extension of the barrel 1. The piston 3 and cylinder 2 are provided with the usual valves 4 and 5, respectively.

The piston 3 is operated by means of the sucker rod 6, which may be formed of one or more sections. In order to prevent vibrations in this rod, I have provided the tube 7, which is supported at its lower end by means of the spider 8 screw threaded into the upper end of the cylinder 2. The tube 7 is screw threaded into the upper end of the spider 8, and its lower end engages the packing gland 9 and wedges the oil-soaked packing 10 against the wall of the rod 6. The upper end of the tube 7 extends through the head 11 of the pump and is provided with a threaded ring 12 against which the packing 13 is forced by the packing gland 14. By the use of nut 11ª all parts are securely locked together, i. e. by tightening up on the nut 11ª the tube 7 is put under tension, and the barrel and cylinder are securely locked in position.

To prevent vibrations of the sucker rod the same is provided with a collar 15 formed with a plurality of ribs or bearing surfaces 16 which engage the inner wall of the tube 7. Where long joints or sections are used these collars may be secured at suitable intervals by means of a set-screw. The collar may also be used as a coupling between sections of the rod, and, when so used, the interior wall is provided with screw threads. It will be noted that the channels in the coupling allow a free passage of the lubricant.

In operation the sucker rod is guided and supported by means of the spider 8, tube 7 and coupling 15 and is well lubricated by the packing 10 and 12.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a pump including a barrel and a cylinder connected thereto, a piston, a sucker rod therefor, a tube through which the sucker rod extends, an integrally formed spider directly threaded to said cylinder and tube, and means for placing a tension on said tube.

2. In a pump including a barrel and a cylinder connected thereto, a piston, a sucker rod therefor, a tube through which the sucker rod extends, a substantially conical integrally formed spider directly threaded to said cylinder and extending into said barrel, and means connecting said tube and spider.

3. In a pump, a piston, a sucker rod therefor, a tube through which the sucker rod extends, a substantially cone shaped spider having a socket in its upper end, a packing gland in said socket, the lower end of said tube being threaded to the spider and engaging the packing gland.

4. A pump including a barrel and a cylinder connected thereto, a piston, a sucker rod therefor, a tube through which the sucker rod extends, a spider directly connected to said cylinder and tube, a head at the top of the barrel and snugly engaging the tube, and a nut threaded to said tube whereby the cylinder, spider, barrel and tube are held in locked position.

JOHN M. STONE.